Figure 1:
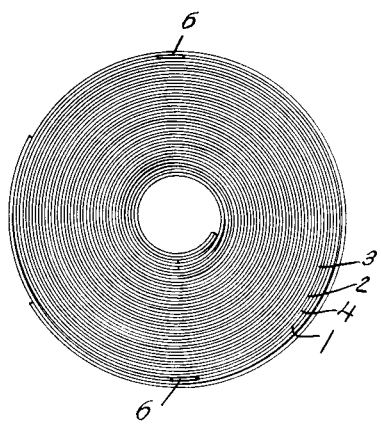

May 15, 1934.                    C. HAMBUECHEN ET AL                    1,959,130
                                         CONDENSER
                              Original Filed Aug. 22, 1931

INVENTORS
C. Hambuechen & C.E. Peters
BY
Pennie, Davis, Marvin & Edmonds
ATTORNEYS Patented May 15, 1934

1,959,130

UNITED STATES PATENT OFFICE 1,959,130

CONDENSER

Carl Hambuechen, Belleville, Ill., and Carl E. Peters, St. Louis, Mo., assignors to Benwood-Linze Company, St. Louis, Mo., a corporation of Missouri Original application August 22, 1931, Serial No. 558,703. Divided and this application June 8, 1932, Serial No. 616,162

13 Claims. (Cl. 175—315)

This invention relates to electrolytic condensers and more particularly to a non-aqueous electrolyte for use in such condensers.

In the ordinary construction of electrolytic condensers of the dry type two sheets of aluminum, or other suitable metal, at least one of which has a current blocking film formed on its surface, are separated from each other and a solution of a suitable electrolyte is placed between them. In the production of condensers for radio work, such as in the filter circuit commonly employed for the elimination of batteries, the devices heretofore available have not been entirely satisfactory. Such condensers must have a high voltage capacity and operate in the neighborhood of 500 volts or more. To obtain this capacity and provide a device of a convenient size and shape, the aluminum strips are coiled and the electrolyte is carried by an absorbent separator arranged between them. One difficulty heretofore encountered is the tendency of the electrolyte to evaporate and thus render the condenser inoperative. It has been proposed to form the electrolyte in a paste or to form aqueous solutions of such strength that they are liquid at elevated temperatures and form a solid mass on cooling. We have found that better results can be obtained by employing solutions of salts in organic compounds having high boiling points so that the electrolyte solution will not evaporate or dry out. Various organic compounds may be employed for this purpose.

In our copending application Serial Number 558,703, filed August 22, 1931, of which this application is a division, we have disclosed the use of several organic liquids in electrolytic condensers. The claims of that application are directed broadly to the use of an organic liquid having a boiling point above 190° C. and specifically to the use of triethanolamine $(CH_2OH.CH_2)_3N$. This application is directed to the ethers of diethylene glycol and specifically to "Carbitol", the monoethyl ether of diethylene glycol $CH_2OH.CH_2OCH_2.CH_2OC_2H_5$, or "Butyl Carbitol", them onobutyl ether of diethylene glycol $CH_2OH.CH_2OCH_2.CH_2OC_4H_9$. The former has a boiling point of 198° C. and the latter has a boiling point of 220° C.

We are aware of the prior use of glycerine in condensers of this character wherein a supersaturated aqueous electrolyte solution is employed and is admixed with glycerine in such proportion that the resulting electrolyte mixture is in the form of a paste. In our condenser we preferably employ a solution of boric acid or ammonium borate in an electrolyte of the character described above and the boric acid solution is of such strength and is used in such manner with the triethanolamine or other organic liquid that the non-aqueous electrolyte solution resulting is not in the form of a paste. We rely upon the high boiling point of the organic liquid to prevent the condenser from drying out.

In constructing the condenser unit, aluminum sheets of proper size and thickness are coiled with a separator of loosely woven fabric or other suitable material arranged between them. For an eight microfarad condenser we preferably employ aluminum sheets having a thickness of .005 inches. Thinner sheets may be used but we have found in commercial practice that this thickness is desirable because condensers constructed therefrom are capable of withstanding rough handling. In a condenser of the capacity set forth above, we preferably employ strips 3 inches by 24 inches. One of the strips is first treated to form an oxide film thereon. This may be done in various ways. We preferably form the film electrolytically by placing the strip in a bath containing 5 grams of boric acid and 1 gram of sodium borate in 9 liters of water. The strip is arranged as an anode in such bath and submitted to an initial current of 100 volts D. C. which is slowly increased to a voltage of about 600. The sheet is sufficiently formed when current at 600 volts is decreased to ¼ ampere. This sheet and a sheet of similar size but not treated in the electrolytic bath is then assembled with two layers of gauze or other loosely woven fabric. We found it advantageous to first clean the surfaces of the sheets by dipping them into a 5% solution of caustic soda. After the aluminum plates and textile separators have been assembled, the unit is placed in a hot solution of boric acid or ammonium borate in the organic liquid used. As stated above, either "Carbitol" or "Butyl Carbitol" may be employed. The unit is allowed to remain in such solution until the gauze is thoroughly saturated.

In the preparation of the solution we employ about one part by weight of boric acid or ammonium borate to three parts by weight of "Carbitol" or "Butyl Carbitol", although these proportions may be varied within wide limits. The condenser is removed from the solution, allowed to drain and then placed in a suitable container. A condenser of this type placed across 450 volts D. C. will have a leakage in the neighborhood of 1 milliampere but will show practically no current flowing when allowed to float across the line for a short period of time.

Figure 2:
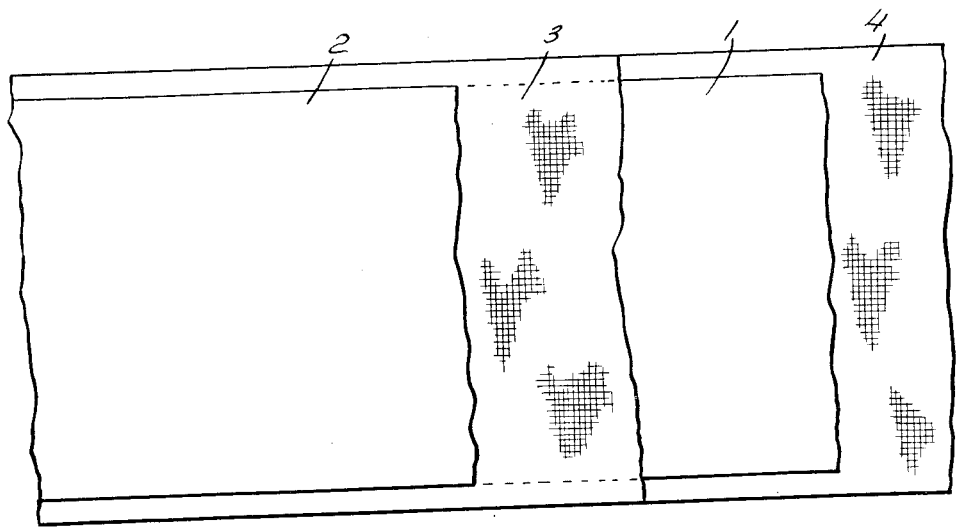

In the accompanying drawing we have diagrammatically illustrated one form of the invention. In the drawing:

Fig. 1 is an end elevation of the coiled aluminum plates and absorbent separator showing the condenser construction before it is placed in a suitable container; and Fig. 2 is a plan view of the condenser elements before coiling showing the two condenser plates and separators.

Referring to the drawing the reference numeral 1 designates one of the aluminum sheets or strips and 2 the other sheet or strip one of which is provided with an oxide film as set forth above. These sheets are separated by a strip of gauze 3 and a similar strip of gauze 4 or other open texture fabric is arranged beneath the strip 1 so that when the strips are coiled, they will be separated by the gauze on each side. Each of the strips is provided with a suitable terminal member 6.

In place of boric acid or ammonium borate any of the common salts which are soluble in the liquids mentioned may be employed and as examples thereof we may use sodium borate, ammonium phosphate, sodium ammonium phosphate, soluble citrates and soluble tartrates. Any of these salts, or mixtures thereof, may be dissolved in either of the liquids mentioned and employed as the electrolyte in a dry electrolytic condenser of the type described above. Resins may be added to the electrolyte solution in the manner heretofore employed in electrolytic condensers of this type. As the solvents are also soluble in water, the conductivity of the electrolyte may be increased by the addition of a small quantity of water. Although we prefer to employ no water in a dry electrolytic condenser in order to obtain the advantages of a non-aqueous solution as set forth above, we consider the use of a small quantity of water to be within the scope of the invention as the advantages of the elimination of water will thereby be obtained in inverse proportion to the quantity of water present.

The electrolyte heretofore described may also be employed in an electrolytic condenser of the wet type. In such case the electrodes are arranged in a casing capable of holding liquid and the non-aqueous solution heretofore described is employed in lieu of the usual aqueous solutions employed in wet condensers. As the details of construction of a wet electrolytic cell form no part of the present invention, and as any of the conventional forms may be used with the electrolyte solution heretofore described, further description of such details is deemed unnecessary.

We claim:

1. An electrical condenser consisting essentially of a pair of spaced electrodes and a non-aqueous electrolyte solution between said electrodes, said solution comprising an ether of diethylene glycol and an inorganic compound containing the borate radical.

2. An electrical condenser consisting essentially of a pair of spaced electrodes and a non-aqueous electrolyte solution between said electrodes, said solution comprising an ether of diethylene glycol and boric acid.

3. An electrical condenser consisting essentially of a pair of spaced electrodes and a non-aqueous electrolyte solution between said electrodes, said solution comprising an ether of diethylene glycol and ammonium borate.

4. An electrical condenser consisting essentially of a pair of spaced electrodes and a non-aqueous electrolyte solution between said electrodes, said solution comprising an ether of diethylene glycol and a soluble salt of a weak acid.

5. An electrical condenser consisting essentially of a pair of spaced electrodes and a non-aqueous electrolyte solution between said electrodes, said solution comprising the monoethyl ether of diethylene glycol and an inorganic compound containing the borate radical.

6. An electrical condenser consisting essentially of a pair of spaced electrodes and a non-aqueous electrolyte solution between said electrodes, said solution comprising the monoethyl ether of diethylene glycol and boric acid.

7. An electrical condenser consisting essentially of a pair of spaced electrodes and a non-aqueous electrolyte solution between said electrodes, said solution comprising the monoethyl ether of diethylene glycol and ammonium borate.

8. An electrical condenser consisting essentially of a pair of spaced electrodes and a non-aqueous electrolyte solution between said electrodes, said solution comprising the monoethyl ether of diethylene glycol and a soluble salt of a weak acid.

9. An electrical condenser consisting essentially of a pair of spaced electrodes and a non-aqueous electrolyte solution between said electrodes, said solution comprising the monobutyl ether of diethylene glycol and an inorganic compound containing the borate radical.

10. An electrical condenser consisting essentially of a pair of spaced electrodes and a non-aqueous electrolyte solution between said electrodes, said solution comprising the monobutyl ether of diethylene glycol and boric acid.

11. An electrical condenser consisting essentially of a pair of spaced electrodes and a non-aqueous electrolyte solution between said electrodes, said solution comprising the monobutyl ether of diethylene glycol and ammonium borate.

12. An electrical condenser consisting essentially of a pair of spaced electrodes and a non-aqueous electrolyte solution between said electrodes, said solution comprising the monobutyl ether of diethylene glycol and a soluble salt of a weak acid.

13. A non-aqueous electrolyte for condensers consisting essentially of an ether of diethylene glycol and an ionogen from the group comprising boric acid, borates, phosphates, soluble citrates and soluble tartrates.

CARL HAMBUECHEN.
CARL E. PETERS.